(12) United States Patent
Naik et al.

(10) Patent No.: US 12,355,228 B2
(45) Date of Patent: Jul. 8, 2025

(54) FAULT PROTECTION FOR SECURITY SYSTEM CONTROLLERS

(71) Applicant: TYCO FIRE & SECURITY GMBH, Neuhausen am Rheinfall (CH)

(72) Inventors: Nilesh Ashok Naik, Sawantawadi Maharastra (IN); Ankit Panchal, Milwaukee, WI (US); Ankit Sinha, Milwaukee, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 17/863,160

(22) Filed: Jul. 12, 2022

(65) Prior Publication Data

US 2024/0022060 A1 Jan. 18, 2024

(51) Int. Cl.
| | |
|---|---|
| *H02H 3/08* | (2006.01) |
| *H02H 1/00* | (2006.01) |
| *H02H 9/02* | (2006.01) |
| *G08B 13/00* | (2006.01) |

(52) U.S. Cl.
CPC ............ *H02H 3/08* (2013.01); *H02H 1/0007* (2013.01); *G08B 13/00* (2013.01)

(58) Field of Classification Search
CPC ......... H02H 3/08; H02H 1/0007; G08B 13/00
USPC ...................................................... 361/93.5
See application file for complete search history.

(56) References Cited

U.S. PATENT DOCUMENTS

| | | | |
|---|---|---|---|
| 4,697,220 A * | 9/1987 | Chung | H02H 7/12 315/307 |
| 5,410,441 A * | 4/1995 | Allman | H02H 11/003 361/84 |
| 5,648,739 A | 7/1997 | Walther et al. | |
| 6,611,410 B1 | 8/2003 | Makaran | |
| 7,800,878 B2 * | 9/2010 | Komatsu | H02M 1/32 361/84 |
| 9,407,086 B2 | 8/2016 | Veil et al. | |
| 11,050,238 B2 * | 6/2021 | Boros | H02H 3/18 |
| 11,075,517 B2 * | 7/2021 | Li | H02J 7/00041 |
| 11,522,363 B2 * | 12/2022 | La Rosa | H02H 11/003 |
| 2007/0268048 A1 | 11/2007 | Komatsu et al. | |
| 2013/0001764 A1 * | 1/2013 | Stella | H01L 23/3114 438/122 |
| 2014/0362480 A1 * | 12/2014 | Veil | B25J 9/1674 361/18 |

(Continued)

FOREIGN PATENT DOCUMENTS

| | | |
|---|---|---|
| CN | 101702509 B | 4/2014 |
| DE | 102020108166 A1 | 9/2021 |

OTHER PUBLICATIONS

International Search Report and Written Opinion issued in International Patent Application No. PCT/US2023/069994 on Oct. 26, 2023.

(Continued)

*Primary Examiner* — Jared Fureman
*Assistant Examiner* — Lucy M Thomas
(74) *Attorney, Agent, or Firm* — ArentFox Schiff LLP

(57) ABSTRACT

Fault protection for security system controllers is disclosed. An apparatus in accordance with aspects of the present disclosure includes for a reverse-polarity protection circuit, an overcurrent protection circuit, or the combination of a reverse polarity circuit and an overcurrent protection circuit.

16 Claims, 4 Drawing Sheets

(56) References Cited

U.S. PATENT DOCUMENTS

2016/0081171 A1* 3/2016 Ichikawa ............. B60Q 1/0088
315/77
2020/0076190 A1 3/2020 La Rosa et al.

OTHER PUBLICATIONS

SMARTXBRAINS, "Design Guide—P MOSFET for Reverse Voltage Polarity Protection", Reverse polarity for security systems, Available on internet at: https://smartxprokits.in/design-guide-p-mosfet-for-reverse-voltage-polarity-protection/, Apr. 4, 2022, 7 pages.

* cited by examiner

FAULT PROTECTION FOR SECURITY SYSTEM CONTROLLERS

BACKGROUND

Field

The present disclosure relates generally to security systems, and more specifically to fault protection for security system controllers.

Background

Security systems are installed in homes and businesses to protect the premises and to control access to the interior or perimeter of a given facility. Many systems are now being installed by home or business owners rather than trained technicians. Even when the system is installed by a trained technician, untrained personnel may repair or modify installed security systems, or technicians from other companies that may be unfamiliar with the security system may modify or repair the installed system.

When a security system is installed, signals such as power, communication, and/or other status signals may be provided to various components within the system. Proper connections between components may insure that the security system is installed correctly and working as desired. In some instances, it may be possible to mis-wire various connections between components, which may result in damage to the components or improper functioning of the security system.

Thus, improvements in security systems are desired.

SUMMARY

Several aspects and features of security systems, methods, and apparatuses are disclosed. The present disclosure provides for a reverse-polarity protection circuit, an overcurrent protection circuit, and the combination of a reverse polarity circuit and an overcurrent protection circuit, which provide fault protection for a security system. Security systems may benefit from such fault protection installed within the system to reduce or eliminate damage of the components during installation, modification, or repair. Security systems may also benefit from such fault protection to protect the system from mis-wiring or other improper connections between components to allow the system to function as desired.

An apparatus in accordance with an aspect of the present disclosure may be a protection circuit, which may comprise a first transistor having a first source, a first gate, and a first drain, wherein the first drain is coupled to an input of the apparatus and the first source is coupled to an output of the apparatus, a diode, wherein a cathode of the diode is coupled to the first source of the first transistor, and a resistor, coupled between an anode of the diode and ground, wherein a first polarity of the input opens a channel of the first transistor, and a second polarity of the input closes the channel of the first transistor.

Such an apparatus may further optionally include being coupled to a power source at the input of the apparatus, the diode being a Zener diode, and an overcurrent protection circuit, coupled to the first transistor.

The overcurrent protection circuit of the apparatus may comprise a second transistor having a second source, a second gate, and a second drain, wherein the second transistor is coupled between the first source and an output of the apparatus, and a voltage divider coupled to the input of the apparatus, wherein an intermediate point of the voltage divider is coupled to the second gate.

The apparatus may further comprise a third transistor, coupled to the voltage divider, the third transistor being coupled in parallel with a resistor of the voltage divider, a shunt resistor coupled between the input of the apparatus and the first drain, and a heat sink coupled to the second transistor.

An apparatus in accordance with an aspect of the present disclosure may be a protection circuit, which may comprise a shunt resistor, a first electrode of the shunt resistor being coupled to an input of the apparatus, a first transistor, a first electrode of the first transistor being coupled to a second electrode of the shunt resistor, a second transistor, a first electrode of the second transistor being coupled to a second electrode of the first transistor, and a second electrode of the second transistor being coupled to an output of the apparatus, a diode, a cathode of the diode being coupled to the second electrode of the first transistor and an anode of the diode being coupled to a third electrode of the first transistor, a voltage divider coupled to the second electrode of the shunt resistor, an intermediate point of the voltage divider being coupled to a third electrode of the second transistor, and a third transistor, a first electrode of the third transistor being coupled to the first electrode of the shunt resistor, a second electrode of the third transistor being coupled to an intermediate point of the voltage divider, and a third electrode of the third transistor being coupled to the second electrode of the shunt resistor, wherein a first polarity of the input opens a channel of the first transistor, and a second polarity of the input closes the channel of the first transistor.

Such an apparatus may further optionally include being coupled to a power source at the input of the apparatus, the diode being a Zener diode, the voltage divider further including a series connection of resistors, the first transistor being a metal-oxide-semiconductor field effect transistor (MOSFET), the second transistor being a metal-oxide-semiconductor field effect transistor (MOSFET), the third transistor being a bipolar junction transistor, and a heat sink coupled to the second transistor.

A protection package in accordance with an aspect of the present disclosure may comprise an input terminal, an output terminal, and a protection circuit, coupled between the input terminal and the output terminal, the protection circuit comprising a shunt resistor, a first electrode of the shunt resistor being coupled to the input terminal, a first transistor, a first electrode of the first transistor being coupled to a second electrode of the shunt resistor, a second transistor, a first electrode of the second transistor being coupled to a second electrode of the first transistor, and a second electrode of the second transistor being coupled to the output terminal, a diode, a cathode of the diode being coupled to the second electrode of the first transistor and an anode of the diode being coupled to a third electrode of the first transistor, a voltage divider coupled to the second electrode of the shunt resistor, an intermediate point of the voltage divider being coupled to a third electrode of the second transistor and a third transistor, a first electrode of the third transistor being coupled to the first electrode of the shunt resistor, a second electrode of the third transistor being coupled to an intermediate point of the voltage divider, and a third electrode of the third transistor being coupled to the second electrode of the shunt resistor, wherein a first voltage polarity at the input terminal opens a channel of the first transistor, and a second voltage polarity at the input terminal closes the channel of the first transistor.

Such a protection package may further optionally include the input terminal being configured to couple to a power source and the output terminal being configured to couple to a load, the power source and the load being configured within a security system, the power source being at least one of a door controller, a power supply, and a network controller, and the load being at least one of a card reader and a notification device.

It will be understood that other aspects of manufacturing, including changes to the overall design and manufacturing process, will become readily apparent to those skilled in the art from the following detailed description, wherein it is shown and described only by way of illustration in the embodiments herein. As can be appreciated by those skilled in the art, the principles or features of the disclosure can be realized with other embodiments without departing from the scope of the present disclosure. Accordingly, the drawings and detailed description are to be regarded as illustrative in nature and not as restrictive.

BRIEF DESCRIPTION OF THE DRAWINGS

Various aspects of the present disclosure will now be presented in the detailed description by way of example, and not by way of limitation, in the accompanying drawings, wherein.

DETAILED DESCRIPTION

The detailed description set forth below in connection with the drawings is intended to provide a description of an exemplary embodiment of an adaptive production system, and it is not intended to represent the only embodiment in which the disclosure may be practiced. The term "exemplary" used throughout this disclosure means "serving as an example, instance, or illustration," and should not necessarily be construed as preferred, advantageous, or exclusive. The detailed description includes specific details for the purpose of providing a thorough and complete disclosure that fully conveys the scope of the disclosure to those skilled in the art. However, the disclosure may be practiced without these specific details. In some instances, well-known structures and components may be shown in block diagram form, or omitted, in order to avoid obscuring the various concepts presented throughout this disclosure.

Overview

Figure 1:
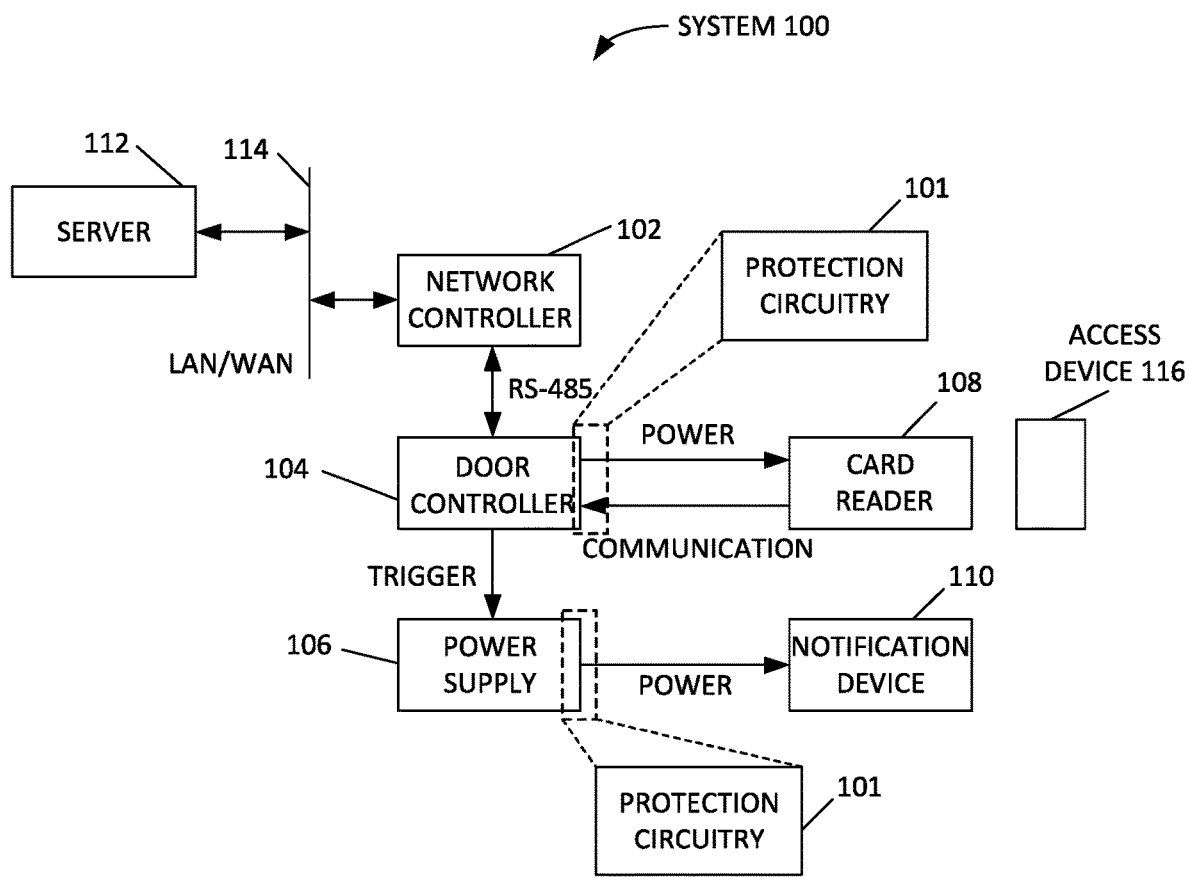
FIG. 1 illustrates a block diagram in accordance with an aspect of the present disclosure.

FIG. 1 illustrates a block diagram in accordance with an aspect of the present disclosure.

A security system 100 in accordance with an aspect of the present disclosure may include protection circuitry 101 between a network controller 102 and one or more security edge devices and/or controllers for these edge devices. The protection circuitry 101 provides the security system 100 with a reverse-polarity protection circuit, an overcurrent protection circuit, or the combination of a reverse polarity circuit and an overcurrent protection circuit. Protection circuitry 101 may be in the form of a small, inexpensive package, and as such, provides fault protection for the relatively more expensive components of the security system 100. Further details of protection circuitry 101 are described below with respect to FIGS. 2-4.

In an aspect, the one or more security edge devices and/or controllers for these edge devices include, but are not limited to, a door controller 104, a power supply 106, a card reader 108, and a notification device 110 (e.g., a light, a display, a fire alarm, a strobe light, a bell, a speaker). It should be understood that the edge devices may include a plurality of additional types of devices, such as but not limited to a camera, a smoke detector, a glass break sensor, an infrared sensor, and/or any other type of security system devices. The network controller may be connected to a server 112 via a network 114.

System 100 may operate in many ways. In an aspect of the present disclosure, system 100 may receive inputs from card reader 108, where users may have an access device 116 having a unique identification code that is read by card reader 108. Access device 116 may be, for example, a radio frequency identification (RFID) card, a magnetic stripe card, a mobile phone, a fob, or other device that can transmit unique information to the card reader 108. The information may then be provided as communication signals between the card reader 108 and the door controller 104.

Door controller 104 may then provide this information to network controller 102, which may be programmed by server 112, to compare the information to information stored within system 100 or to compare the information to programmed information within system 100, to determine if access device 116 is an authorized device to allow access to the premises. Such information may be a single code or "signature" or may be a rolling or changing code or information depending on the system 100. The information may be unique to each access device 116, or may be different for each access device 116 that is authorized by system 100, as desired.

Network controller 102 may then provide door controller 104 with a signal, which may be via RS-485 cabling, whether or not the information is authorized and/or to allow or deny access to the premises. Door controller 102, upon receipt of this signal, would trigger power supply 106 to supply power to notification device 110 to indicate a condition, e.g., fire alarm (if the door is a fire exit), authorized access, unauthorized access, etc., at the given location of notification device 110. Additionally, for example, and not by way of limitation, if card reader 108 is located at a front door of a premises, and access device 116 is presented to that particular card reader 108, door controller 104 may provide power to a lock at the location of card reader 108 to unlock the front door to the premises. Of course, there may be more than one card reader 108 and more than one notification device 110 at a given premises, as there may be various access points to the premises or within a given premises. In such embodiments, each card reader 108 may provide a unique identifier to allow a given notification device 110 to be activated, e.g., for different doorways, etc. of a premises.

Server 112, either being directly coupled to network controller 102 or being coupled to network controller 102 via network 114, may record one or more instances of use of system 100, allow new devices 116 to be authorized by system 100, and/or delete devices 116 from accessing system 100 as desired. Server 112, network controller 102, door controller 104, power supply 106, card reader 108, and notification device 110 may be located at various points within a given building, or may be located within different buildings, as well as being located outside of a given premises, as desired. Additionally or alternatively, one or more components of system 100 may be coupled to other portions of system 100 via a cloud-based network.

Figure 2:
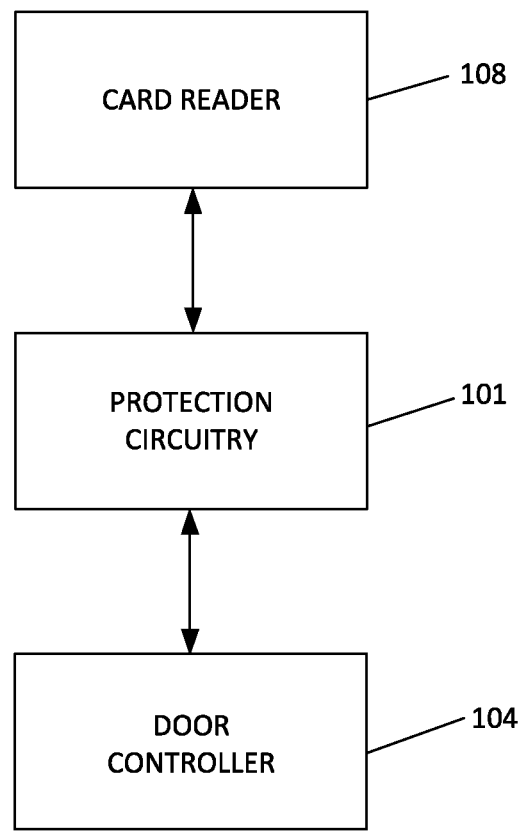
FIG. 2 illustrates a block diagram in accordance with an aspect of the present disclosure.

FIG. 2 illustrates a block diagram in accordance with an aspect of the present disclosure.

When system 100 is installed, modified, or repaired, the interconnections between the various components of system 100 may be mis-wired or accidently connected improperly. An example of such mis-wiring is the connection between the door controller 104 and the card reader 108. Such connections are of particular importance when connections are made to a power source, such as power supply 106 or when power sources are installed on various components such as door controller 104.

In an aspect of the present disclosure, the polarity of the power coming from door controller 104 may be reversed when connected to card reader 108, which may cause damage to door controller 104 and/or card reader 108. In an aspect of the present disclosure, the current from door controller 104 may be too high for card reader 108 to accept, e.g., a short-circuit condition, which may also cause damage to door controller 104. In such aspects, door controller 104 may be damaged or, in some instances, may fail to operate properly.

In an aspect of the present disclosure, protection circuitry 101 may be provided as part of system 100 as a fault protection circuit or device. Protection circuitry 101 may be provided as part of a component of system 100, e.g., door controller 104, card reader 108, etc., or as a stand-alone interconnection between door controller 104 and card reader 108, etc., as desired. Protection circuitry may be provided anywhere in system 100 where power is provided between components, e.g., between door controller 104 and card reader 108, between power supply 106 and notification device 110, etc.

Figure 3:
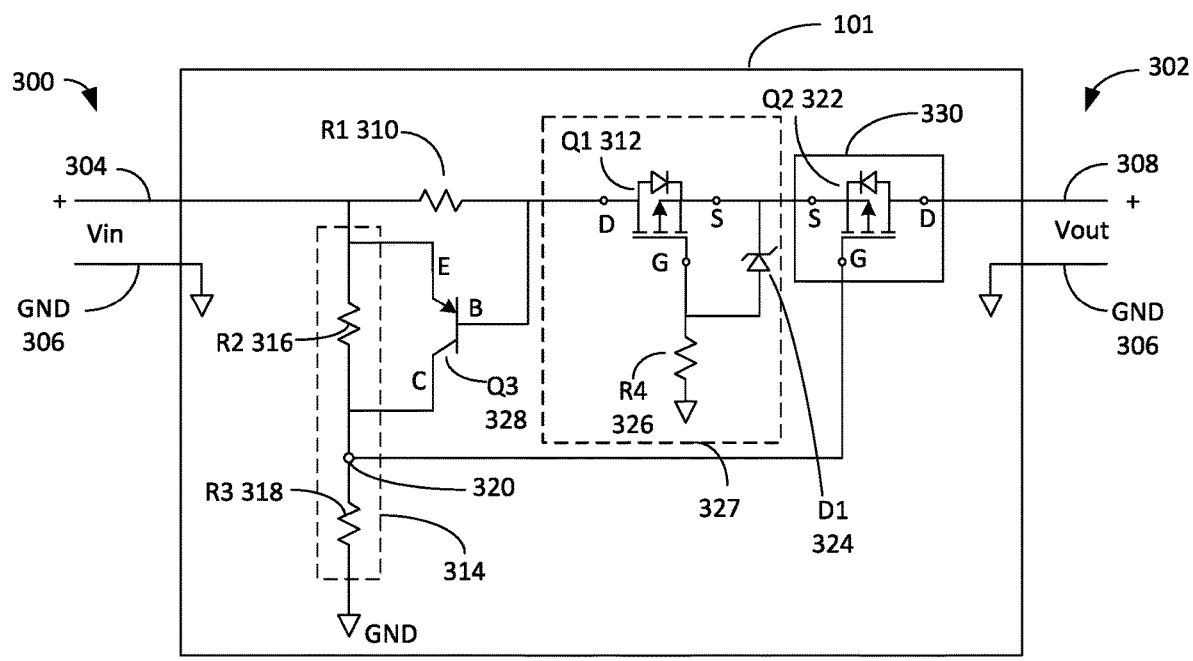
FIG. 3 illustrates a schematic of a fault protection circuit in accordance with an aspect of the present disclosure.

FIG. 3 illustrates a schematic of a fault protection circuit in accordance with an aspect of the present disclosure.

In an aspect of the present disclosure, when initially coupling components in system 100, there is a possibility of connecting components with polarities reversed. In an aspect of the present disclosure, the connection between door controller 102 and power supply 106 is of concern, because of the larger voltages and currents that traverse this connection.

During maintenance or repair, or even during operation of the system 100, other conditions may occur that may create deleterious effects on system 100 or the various components within system 100. For example, and not by way of limitation, the connection between power supply 106 and door controller 104 may be cut or short circuited, which may cause an overcurrent condition. Reverse polarity connections and/or short circuit conditions may damage the circuitry of door controller 104 or other components within system 100. Reverse polarity and/or short circuit conditions may also lead to faulty operation of system 100.

In an aspect of the present disclosure, protection circuitry 101 may be included within system 100 as a standalone module for connection between components and/or as part of one or more components within system 100, e.g., network controller 102, door controller 104, power supply 106, notification device 110, etc. For example, power sources within system 100, e.g., network controller 102, door controller 104, power supply 106, etc., may be coupled to electrical devices that require power, i.e., loads. Loads in system 100 may be network controller 102, door controller 104, card reader 108, notification device 110, etc. Protection circuitry 101, which may be packaged in many ways in accordance with an aspect of the present disclosure, may be coupled between at least one power source and at least one load, and may be coupled in one or more than one location within system 100 as desired.

Reverse Polarity Protection

As shown in FIG. 3, an input voltage Vin 300 is supplied to protection circuitry 101. Vin 300 may be supplied by power supply 106, or may be supplied by other components within system 100 or outside of system 100. Protection circuitry 101 has an output voltage Vout 302, which is supplied to one or more components within system 100, e.g., door controller 104.

Vin 300 has a positive lead 304, which, in desired operation, has a positive voltage with respect to ground 306. Vout 302 has a positive lead 308, which, in desired operation, has a positive voltage with respect to ground 306.

Proper Connection Operation

In an aspect of the present disclosure, where the connection for Vin 300 is at a desired polarity, i.e., where lead 304 has a positive voltage with respect to ground 306, current will flow through shunt resistor R1 310 and through the inherent body diode of a P-channel metal oxide semiconductor field effect transistor (MOSFET) Q1 312. Q1 312 has three electrodes or electrical connections: a drain (D), a source (S), and a gate (G). As shown in FIG. 3, a first electrode of R1 310 is coupled to lead 304, which is an input to protection circuitry 101, and a second electrode of R1 310 is coupled to an electrode of Q1 312, e.g., the drain (D) of Q1 312. Current will also flow through the voltage divider 314, which includes R2 316 and R3 318, providing a voltage between ground 306 and a positive voltage value at point 320. When lead 304 is positive with respect to ground 306, the voltage at source (S) of Q1 312 starts increasing. As the voltage at source (S) of Q1 312 increases with respect to the gate (G) of Q1 312, the voltage at the gate (G) of Q1 312 will become smaller than the voltage at the source (S) of Q1 312 (also known as the voltage at the gate (G) of Q1 312 being "negative relative" to the voltage at the source (S) of Q1 312), which allows current to flow through the channel of Q1 312 (also known as "turning on Q1 312"). In an aspect of the present disclosure, the resistance between the drain (D) of Q1 312 and the source (S) of Q1 312 is quite small.

The voltage at point 320 will also be positive with respect to ground 306, which will provide a positive voltage to the gate (G) of P-channel MOSFET Q2 322. Q2 322 also has three electrodes or electrical connections: a drain (D), a source (S), and a gate (G). However, because the voltage at the source (S) of Q2 322 is approximately the voltage at lead 304 (minus any voltage drop across R1 310), the voltage at the gate (G) of Q2 322 is negative relative to the voltage at the source (S) of Q2 322. This condition opens the channel of Q2 322 and allows the voltage from Vin 300, particularly the relatively positive voltage of lead 304, to be present at positive lead 308 of Vout 302.

In an aspect of the present disclosure, the resistance value of resistor R1 310 may be small, e.g., on the order of a few ohms, which would allow for the voltage at lead 304 to be present at lead 308. The resistance across the channels of Q1 312 and Q2 322 are often small, and as such, any voltage drop between lead 304 and lead 308 would be across R1 310.

Reverse Polarity Connection Operation

In an aspect of the present disclosure, where the connection for Vin 300 is at a reversed polarity, i.e., where lead 304 has a negative voltage with respect to ground 306, the current will not flow through the inherent body diode of Q1 312. When lead 304 is negative with respect to ground 306, the voltage at source (S) of Q1 312 does not go negative relative to the gate (G) of Q1 312 because the voltage at the drain (D) of Q1 312 is less than the voltage of the source (S) of Q1 312 and the gate (G) of Q1 312. As such, Q1 312 does not turn on, and current cannot flow through the channel of Q1 312. Q2 322 cannot turn on because although the voltage from point 320 is negative there is no current being supplied to the drain (D) of Q2 322 from Q1 312.

In an aspect of the present disclosure, when the connection for Vin 300 is at a proper polarity and the difference in voltage between lead 304 and ground 306 can be large, diode D1 324, which may be a Zener diode, and resistor R4 326 may be included in protection circuitry 101 to protect the gate (G) of Q1 312 from achieving too low of a voltage with respect to the source (S) of Q1 312. D1 324 has two electrodes or electrical connections: a cathode and an anode. As shown in FIG. 3, the cathode of diode D1 324 is coupled to the source (S) of Q1 312, and the anode of diode D1 324 is coupled to R4 326. The opposite lead of R4 326 is coupled to ground. The series connection of D1 324 and R4 326 may act as a shunt regulator for Q1 312 to keep the gate (G) of Q1 312 from having a voltage that is too negative relative to the voltage at the source (S) of Q1 312.

In an aspect of the present disclosure, circuit 327, which includes Q1 312, D1 324, and R4 326, may act as a reverse-polarity protection circuit within system 100. In an aspect of the present disclosure, circuit 327 could stand alone without the remainder of protection circuitry 101 and act as a reverse-polarity protection circuit as desired.

Over Current (Short-Circuit) Protection

In an aspect of the present disclosure, some of the components of protection circuitry 101 can be used to perform over-current protection and/or short-circuit protection for any circuits connected to Vout 308, e.g., door controller 104, etc. In such an aspect, circuits or components of system 100 may be protected by portions of protection circuitry 101 even when a power supply is coupled correctly to Vin 300.

In an aspect of the present disclosure, R1 310 acts as a shunt resistor, and Q2 322 is coupled in a forward-biased configuration.

The value of R1 310 and the provided voltage at lead 304 defines the current flowing through the series connection of R1 310, Q1 312, and Q2 322 to lead 308, where any load would be attached. If there is a short circuit condition at lead 308, or an unexpected drop in load resistance at lead 308, the current through the series connection of R1 310, Q1 312, and Q2 322 will increase.

Since the resistances of Q1 312 and Q2 322 are essentially zero when the channels of Q1 312 and Q2 312 are open, the increase in current due to the change in the load resistance present at lead 308 will increase the current through R1 310, changing the value of the voltage drop across R1 310. This change in voltage will increase the voltage at the base (B) of Q3 328, which will turn Q2 328 on. Q3 is a bipolar junction transistor, which has three electrodes or electrical connections: an emitter (E), a collector (C), and a base (B).

Once Q3 328 is turned on, the resistance between the emitter (E) and the collector (C) of Q3 328, which is approximately zero, is in parallel with R2 316, which lowers the effective resistance value of R2 316. Q3 328, when turned on, increases the voltage value at point 320, which may be an intermediate point of the voltage divider. Point 320 is coupled to the gate (G) of Q2 322. This increases the voltage of the gate (G) of Q2 322, which becomes positive with respect to the source (S) of Q2 322, turning Q2 322 off.

Depending on the voltage drop across R1 310, Q3 328 may be operated in the linear region, which will allow some excess current to flow through Q3 328, reducing the current flowing through Q2 322. As the voltage at point 320 slowly reduces to close the gate (G) of Q2 322, less and less current flows through Q2 322. Once the voltage at point 320 is high enough, Q2 322 will turn off, which isolates Vout 302 from Vin 300.

When Q3 328 is operated in the linear region, the increased voltage at point 320 begins to close the channel of Q2 322, which reduces the amount of current that flows through lead 308. As such, a feedback loop may be created by the values of R1 310 and R3 318, which control the voltage at the base (B) of Q3 328 and the voltage at point 320.

To reduce the possibility that protection circuitry 101 goes into a current-limiting situation, heat sink 330 may be provided to provide additional thermal mass to Q2 322. Q2 322 may also be sized to accept larger amounts of electrical power in order to allow for over-current protection within protection circuitry 101.

In an aspect of the present disclosure, the protection circuitry 101 may omit circuit 327 and use the remaining components as a standalone overcurrent protection circuit as desired.

Figure 4:
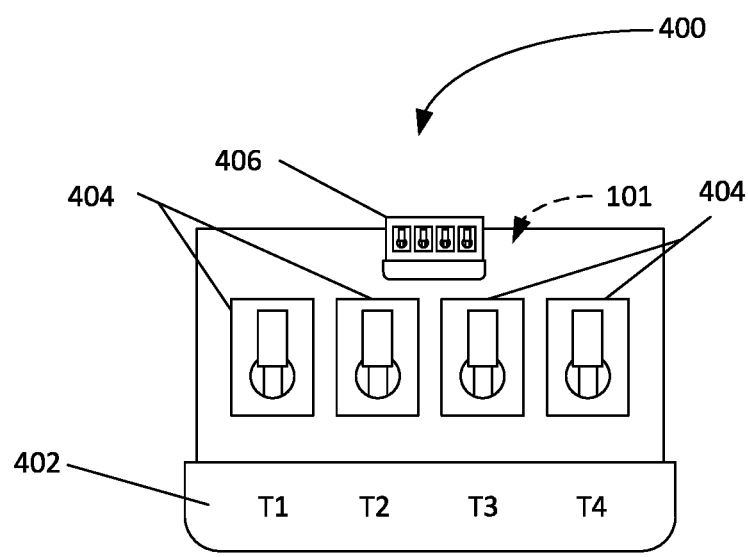
FIG. 4 illustrates a protection circuitry package in accordance with an aspect of the present disclosure.

FIG. 4 illustrates a protection circuitry package in accordance with an aspect of the present disclosure.

Package 400 defines a housing for protection circuitry 101, and further includes labeling area 402, terminals 404, and connector 406.

Labeling area 402 may provide an area to identify the terminals 404 such that the connections to the terminals 404 are made properly. As described with respect to FIG. 3, the terminal 404 that is associated with lead 304 may be connected to terminal T1, the terminal 404 that is associated with lead 308 may be connected to terminal T3, and the terminals 404 that are associated with ground may be associated with terminals T2 and T4. Other connections are possible without departing from the scope of the present disclosure.

Terminals 404 provide a location to connect one or more wires to package 400. Connector 406 provides a connection to one or more components within system 100, e.g., door controller 104, card reader 108, etc.

Package 400 may be of a small size, e.g., 32 millimeters by 32 millimeters by 8 millimeters thick, such that package 400 may be used as a "plug-and-play" device with one or more components within system 100. In an aspect of the present disclosure, package 400 may be a uniform size such that package 400, containing protection circuitry 101, may be used in multiple locations within system 100 as desired.

The previous description is provided to enable any person skilled in the art to practice the various aspects described herein. Various modifications to these exemplary embodiments presented throughout this disclosure will be readily apparent to those skilled in the art, and the concepts disclosed herein may be applied in other ways than the examples disclosed herein. Thus, the claims are not intended to be limited to the exemplary embodiments presented throughout the disclosure, but are to be accorded the full scope consistent with the language claims. Structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

Any claims based on the present disclosure are not intended to be limited to the example embodiments presented throughout the disclosure, but are to be accorded the full scope consistent with the language claims. Structural and functional equivalents to the elements of the example embodiments described throughout the present disclosure that are known or later come to be known to those of ordinary skill in the art are intended to be encompassed in the claims.

What is claimed is:

1. A protection circuit, comprising:
   a first transistor having a first source, a first gate, and a first drain; wherein the first drain is coupled to an input of the protection circuit through a shunt resistor and the first source is coupled to an output of the protection circuit, wherein the protection circuit is coupled to a power source at the input of the protection circuit;
   a diode, wherein a cathode of the diode is coupled to the first source of the first transistor, wherein the diode is a Zener diode;
   an overcurrent protection circuit, coupled to the first transistor, wherein the overcurrent protection circuit comprises:
      a second transistor having a second source, a second gate, and a second drain, wherein the second transistor is coupled between the first source and an output of the protection circuit, and
      a voltage divider coupled to the input of the protection circuit, wherein an intermediate point of the voltage divider is coupled to the second gate;
   a third transistor coupled in parallel with a first resistor of the voltage divider; and
   a second resistor, coupled between an anode of the diode and ground such that one electrode of the second resistor is coupled directly to ground and another electrode of the second resistor is coupled to the anode of the diode, wherein a first polarity of the input opens a channel of the first transistor, and a second polarity of the input closes the channel of the first transistor.

2. The protection circuit of claim 1, wherein the shunt resistor is coupled between the input of the protection circuit and the first drain.

3. The protection circuit of claim 2, further comprising a heat sink coupled to the second transistor.

4. A protection circuit, comprising:
   a shunt resistor, a first electrode of the shunt resistor being coupled to an input of the protection circuit;
   a first transistor, a first electrode of the first transistor being coupled to a second electrode of the shunt resistor;
   a second transistor, a first electrode of the second transistor being coupled to a second electrode of the first transistor, and a second electrode of the second transistor being coupled to an output of the protection circuit;
   a diode, a cathode of the diode being coupled to the second electrode of the first transistor and an anode of the diode being coupled to a third electrode of the first transistor;
   a voltage divider coupled to the first electrode of the shunt resistor, an intermediate point of the voltage divider being directly coupled to a third electrode of the second transistor; and
   a third transistor, a first electrode of the third transistor being coupled to the first electrode of the shunt resistor, a second electrode of the third transistor being coupled to an intermediate point of the voltage divider, and a third electrode of the third transistor being coupled to the second electrode of the shunt resistor, wherein a first polarity of the input opens a channel of the first transistor, and a second polarity of the input closes the channel of the first transistor.

5. The protection circuit of claim 4, wherein the protection circuit is coupled to a power source at the input of the protection circuit.

6. The protection circuit of claim 4, wherein the diode is a Zener diode.

7. The protection circuit of claim 4, wherein the voltage divider further comprises a series connection of resistors.

8. The protection circuit of claim 4, wherein the first transistor is a metal-oxide-semiconductor field effect transistor (MOSFET).

9. The protection circuit of claim 4, wherein the second transistor is a metal-oxide-semiconductor field effect transistor (MOSFET).

10. The protection circuit of claim 4, wherein the third transistor is a bipolar junction transistor.

11. The protection circuit of claim 4, further comprising a heat sink coupled to the second transistor.

12. A protection package, comprising:
   an input terminal;
   an output terminal; and
   a protection circuit, coupled between the input terminal and the output terminal, the protection circuit comprising:
      a shunt resistor, a first electrode of the shunt resistor being coupled to the input terminal;
      a first transistor, a first electrode of the first transistor being coupled to a second electrode of the shunt resistor;
      a second transistor, a first electrode of the second transistor being coupled to a second electrode of the first transistor, and a second electrode of the second transistor being coupled to the output terminal;
      a diode, a cathode of the diode being coupled to the second electrode of the first transistor and an anode of the diode being coupled to a third electrode of the first transistor;
      a voltage divider coupled to the first electrode of the shunt resistor, an intermediate point of the voltage divider being directly coupled to a third electrode of the second transistor; and
      a third transistor, a first electrode of the third transistor being coupled to the first electrode of the shunt resistor, a second electrode of the third transistor being coupled to an intermediate point of the voltage divider, and a third electrode of the third transistor being coupled to the second electrode of the shunt resistor, wherein a first voltage polarity at the input terminal opens a channel of the first transistor, and a second voltage polarity at the input terminal closes the channel of the first transistor.

13. The protection package of claim 12, wherein the input terminal is configured to couple to a power source and the output terminal is configured to couple to a load.

14. The protection package of claim 13, wherein the power source and the load are configured within a security system.

15. The protection package of claim 14, wherein the power source is at least one of a door controller, a power supply, and a network controller.

16. The protection package of claim 14, wherein the load is at least one of a card reader and a notification device.

* * * * *